United States Patent
Gounares et al.

(10) Patent No.: US 8,495,598 B2
(45) Date of Patent: Jul. 23, 2013

(54) CONTROL FLOW GRAPH OPERATING SYSTEM CONFIGURATION

(75) Inventors: Alexander G. Gounares, Kirkland, WA (US); Charles D. Garrett, Woodinville, WA (US)

(73) Assignee: Concurix Corporation, Kirkland, WA (US)

( * ) Notice: Subject to any disclaimer, the term of this patent is extended or adjusted under 35 U.S.C. 154(b) by 0 days.

(21) Appl. No.: 13/461,755

(22) Filed: May 1, 2012

(65) Prior Publication Data
US 2012/0222019 A1    Aug. 30, 2012

(51) Int. Cl.
*G06F 9/45*    (2006.01)

(52) U.S. Cl.
USPC ........................................................ 717/140

(58) Field of Classification Search
USPC ........................................................ 717/140
See application file for complete search history.

(56) References Cited

U.S. PATENT DOCUMENTS

| | | | |
|---|---|---|---|
| 3,643,227 A | 2/1972 | Smith et al. | |
| 4,631,674 A | 12/1986 | Blandy | |
| 5,506,987 A | 4/1996 | Abramson et al. | |
| 6,104,962 A | 8/2000 | Sastry | |
| 6,128,642 A | 10/2000 | Doraswamy et al. | |
| 6,230,183 B1 | 5/2001 | Yocom et al. | |
| 6,658,449 B1 | 12/2003 | Brenner et al. | |
| 6,735,769 B1 | 5/2004 | Brenner et al. | |
| 6,748,593 B1 | 6/2004 | Brenner et al. | |
| 6,763,520 B1 | 7/2004 | Seeds | |
| 6,823,515 B2 | 11/2004 | LiVecchi | |
| 6,954,775 B1 | 10/2005 | Shanklin et al. | |
| 6,986,140 B2 | 1/2006 | Brenner et al. | |
| 6,993,767 B2 | 1/2006 | Brenner et al. | |
| 7,228,541 B2 * | 6/2007 | Gupton et al. | 717/175 |
| 7,251,815 B2 | 7/2007 | Donovan et al. | |
| 7,487,237 B2 | 2/2009 | Lloyd et al. | |
| 7,797,670 B2 | 9/2010 | Bumgarner et al. | |
| 7,865,707 B2 | 1/2011 | Bittlingmayer | |
| 8,108,863 B2 | 1/2012 | Rakvic et al. | |
| 2001/0018701 A1 | 8/2001 | LiVecchi | |
| 2003/0200356 A1 * | 10/2003 | Hue | 709/322 |
| 2003/0212731 A1 | 11/2003 | Brenner et al. | |
| 2005/0071847 A1 * | 3/2005 | Bentley et al. | 719/310 |
| 2005/0210472 A1 | 9/2005 | Accapadi et al. | |
| 2008/0139191 A1 | 6/2008 | Melnyk | |

(Continued)

FOREIGN PATENT DOCUMENTS
EP    1912119 A1    4/2008

OTHER PUBLICATIONS

International Searching Authority, International Search Report and Written Opinion, Feb. 5, 2013, PCT/US2012/056704, Korean Intellectual Property Office, Republic of Korea (9 pgs.).

*Primary Examiner* — Philip Wang
(74) *Attorney, Agent, or Firm* — Russell S. Krajec

(57) ABSTRACT

An operating system may be configured using a control flow graph that defines relationships between each executable module. The operating system may be configured by analyzing an application and identifying the operating system modules called from the application, then building a control flow graph for the configuration. The operating system may be deployed to a server or other computer containing only those components identified in the control flow graph. Such a lightweight deployment may be used on a large scale for datacenter servers as well as for small scale deployments on sensors and other devices with little processing power.

20 Claims, 4 Drawing Sheets

U.S. PATENT DOCUMENTS

| | | |
|---|---|---|
| 2008/0271032 A1 | 10/2008 | Twaddle |
| 2012/0222043 A1 | 8/2012 | Gounares et al. |
| 2012/0227040 A1 | 9/2012 | Gounares |
| 2012/0233592 A1 | 9/2012 | Gounares |
| 2012/0233601 A1 | 9/2012 | Gounares et al. |
| 2012/0317371 A1 | 12/2012 | Gounares |
| 2012/0317389 A1 | 12/2012 | Gounares |
| 2012/0317421 A1 | 12/2012 | Gounares |
| 2012/0317557 A1 | 12/2012 | Garrett |
| 2012/0317577 A1 | 12/2012 | Garrett |
| 2012/0317587 A1 | 12/2012 | Garrett |
| 2012/0324454 A1 | 12/2012 | Gounares et al. |
| 2013/0067445 A1 | 3/2013 | Gounares et al. |
| 2013/0073523 A1 | 3/2013 | Gounares et al. |
| 2013/0073604 A1 | 3/2013 | Gounares et al. |
| 2013/0073829 A1 | 3/2013 | Gounares et al. |
| 2013/0073837 A1 | 3/2013 | Li et al. |
| 2013/0074049 A1 | 3/2013 | Gounares et al. |
| 2013/0074055 A1 | 3/2013 | Gounares et al. |
| 2013/0074056 A1 | 3/2013 | Gounares et al. |
| 2013/0074057 A1 | 3/2013 | Gounares et al. |
| 2013/0074058 A1 | 3/2013 | Gounares et al. |
| 2013/0074092 A1 | 3/2013 | Gounares et al. |
| 2013/0074093 A1 | 3/2013 | Gounares et al. |
| 2013/0080760 A1 | 3/2013 | Li et al. |
| 2013/0080761 A1 | 3/2013 | Garrett et al. |
| 2013/0081005 A1 | 3/2013 | Gounares et al. |
| 2013/0085882 A1 | 4/2013 | Gounares et al. |
| 2013/0117753 A1 | 5/2013 | Gounares et al. |
| 2013/0117759 A1 | 5/2013 | Gounares et al. |

* cited by examiner

CONTROL FLOW GRAPH OPERATING SYSTEM CONFIGURATION

BACKGROUND

Control flow graphs are used in computer science to represent all of the paths a program may traverse during execution of the program. In a control flow graph, each node may represent a block of code, and the edges of the graph represent possible jumps in the control flow. Control flow graphs are often used in static analyses of code, as well as various compiler optimizations.

SUMMARY

An operating system may be configured using a control flow graph that defines relationships between each executable module. The operating system may be configured by analyzing an application and identifying the operating system modules called from the application, then building a control flow graph for the configuration. The operating system may be deployed to a server or other computer containing only those components identified in the control flow graph. Such a lightweight deployment may be used on a large scale for datacenter servers as well as for small scale deployments on sensors and other devices with little processing power.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
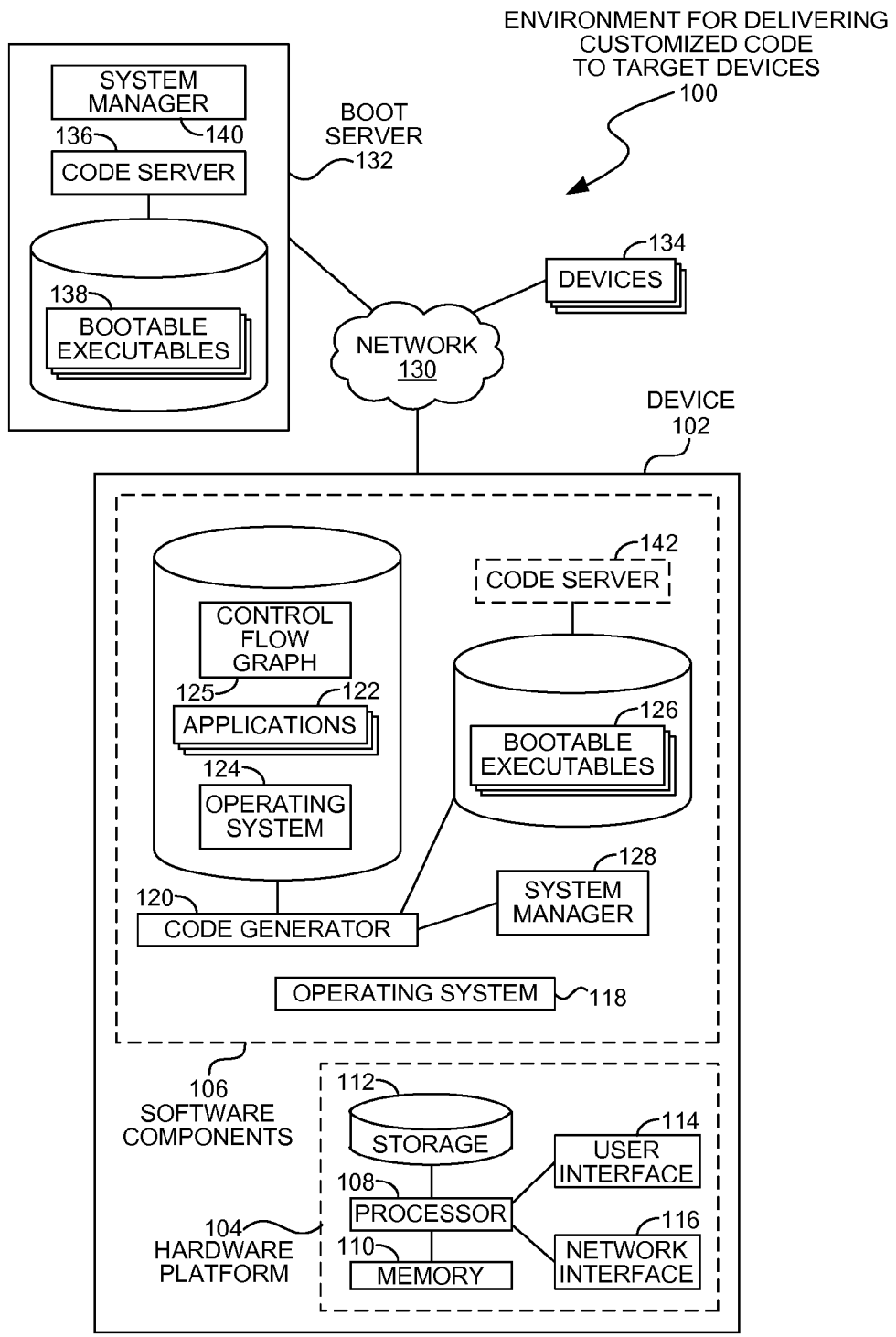
FIG. 1 is a diagram illustration of an embodiment showing a system where customized code may be created for target devices.

An operating system may use a control flow graph to manage the configuration of a computer system. The control flow graph may identify relationships between application components, operating system components, and other executable modules. Based on the analysis of applications and operating system functions, the software configuration for a device may be determined and downloaded to the device by a management system.

The configuration of a computer system may be determined by identifying any applications that may execute and creating a control flow graph that identify relationships to operating system components. From the control flow graph, a lightweight operating system may be constructed that contains only those elements called by the applications. The lightweight operating system may be created and downloaded to the device, along with the applications, as part of a startup sequence that may occur over a network.

A network server may create and deploy an operating system and other executable applications upon request to a device during a bootstrapping operation. In response to the request, the network server may either create an operating system or have an operating system ready for deployment. The device may receive all of the executable code to operate, but may not include other executable code that has not been identified to be executed.

The system may be used in several use scenarios. In a first use scenario, server computers in a datacenter environment may request operating system and executable loads when the server computers are booted. A network manager may deploy a lightweight operating system with accompanying application loads to each server computer. In some cases, each server computer may receive a different configuration of the underlying operating system that corresponds with the specific application being executed by that server computer. In such a use scenario, the server computers may execute the workload with the full complement of operating system functions called by that application, but may not have the overhead of extraneous operating system services and functions.

In another use scenario, networked sensor devices that may have little processing capability may come online on a network and request executable software from a management system. The management system may deploy a subset of the entire operating system along with an application for the sensor device to execute. In such a use scenario, the sensor device may have only that operating system code that may relate to the application being executed. Such a deployment may take less time to transmit to the device than a full operating system, plus the deployment may consume fewer resources and result in improved performance of the sensor device.

A control flow graph may identify chains of executable elements that have dependencies that flow from data received. These executable elements may be scheduled to minimize intervening processes so that the data may be processed quickly and efficiently.

The dependencies between executable elements may be explicit or implicit. Explicit dependencies may be defined within a programming language and identified by a programmer. In some cases, compilers or linkers may analyze source code to identify and explicitly link various executable elements. The explicit links between executable elements may be identified by messages that may be passed between two elements. In some cases, the messages may be addressed and passed from one element to another.

Some dependencies may be implied by how data may be shared between executable elements. A dependency may be identified, for example, when a consuming element uses a data object created by a creating element. The consuming element may be considered to have a dependency on the creating element even though no other relationship may be identified during normal compilation and linking.

For the purposes of this specification and claims, the term "executable element" may define a set of instructions that may be executed by a processor. In a typical embodiment, an executable element may be machine level commands that may be sent to a processor. A single computer application may be made up of many executable elements. An executable element may also be referred to as a job, application, code chunk, or other term.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system that may create different versions of executable code from a control flow graph. Embodiment 100 is a simplified example of the various software and hardware components that may be used to create lightweight executable code that may be deployed to target devices.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 100 illustrates a computer system 102 that may create a set of executable code from applications and operating system components. The executable code may be a minimum set of executable code that allows a target device to perform a specific function set and may include a subset of the available operating system components.

The executable code may be created by identifying executable elements that are connected by a control flow graph. The control flow graph may define each of the various executable elements for an application, along with calls into the operating system, thereby capturing the elements of the operating system.

The executable code may be bootable code that a target device may acquire over a network connection. When the target device starts up, the device may query over a network to find a server, and the server may provide an operating system and other executable code for the device to execute.

The executable code identified from the control flow graph may be all of the code that may execute a function set, but may not include other code that would not be executed when performing the function set. Such a set of executable code may allow the target device to operate efficiently and quickly, while minimizing the amount of information that may be downloaded to the device.

In one embodiment, the target device may be a server in a datacenter. The target device may be configured with software that allows the device to perform a specific function, such as load balancing for a web server farm. The target device may receive just the code that would perform the load balancing function, as well as any administrative functions such as monitoring or other functions. In such an embodiment, the target server device may execute its workload with a minimum of other functions.

In another embodiment, the target device may be a sensor device that may have a limited hardware platform. The sensor device may have a low power processor and little memory. As the sensor device comes online and communicates with a managing server, the server may create a small set of executable code that allows the sensor device to perform its function but may not include extra software that the device may not be able to execute.

The executable code may be defined prior to or after a request for the executable code is received. In some embodiments, a set of executable code may be automatically generated and stored in a database. When a request for bootable code is received, a boot server may select the pre-configured code and transmit the code to the target device.

In other embodiments, the set of executable code may be generated on the fly or in response for bootable code. In such embodiments, a decision for what feature set to apply to a target device may be made at the time the device is booting up. Such embodiments may create new versions of applications and operating systems with each new request.

The device 102 is illustrated having hardware components 104 and software components 106. The device 102 as illustrated represents a conventional computing device, although other embodiments may have different configurations, architectures, or components.

In many embodiments, the device 102 may be a server computer. In some embodiments, the device 102 may still also be a desktop computer, laptop computer, netbook computer, tablet or slate computer, wireless handset, cellular telephone, game console or any other type of computing device.

The hardware components 104 may include a processor 108, random access memory 110, and nonvolatile storage 112. The hardware components 104 may also include a user interface 114 and network interface 116. The processor 108 may be made up of several processors or processor cores in some embodiments. The random access memory 110 may be memory that may be readily accessible to and addressable by the processor 108. The nonvolatile storage 112 may be storage that persists after the device 102 is shut down. The nonvolatile storage 112 may be any type of storage device, including hard disk, solid state memory devices, magnetic tape, optical storage, or other type of storage. The nonvolatile storage 112 may be read only or read/write capable.

The user interface 114 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 116 may be any type of connection to another computer. In many embodiments, the network interface 116 may be a wired Ethernet connection. Other embodiments may include wired or wireless connections over various communication protocols.

The software components 106 may include an operating system 118 on which various applications and services may operate. An operating system may provide an abstraction layer between executing routines and the hardware components 104, and may include various routines and functions that communicate directly with various hardware components.

A code generator 120 may take applications 122, an operating system 124, and a control flow graph 125 to generate bootable executables 126. The bootable executables 126 may be transmitted to a target device 134 for execution. The applications 122 and operating system 124 may be the applications and operating system that are executed by the target device 134. In some cases, the applications 122 and operating system 124 may not be executable on the device 102.

The code generator 120 may receive a feature set from a system manager 128. The system manager 128 may determine the functionality provided to different target devices 134. In some embodiments, a system manager 128 may deploy certain functionality to different devices as part of a larger cluster or system that uses different devices to perform subsets of the overall system.

In a simple example of a web service, a system manager may identify two devices for load balancing, a dozen devices for servicing web calls, and another group of devices for providing backend database services. Each device may be provided with different bootable executables 126 that include the functions defined for the specific device.

The feature set defined by a system manager 128 may define applications, subsets of applications, services, operating system functions, or other functions that a target device may provide. In some embodiments, the feature set may identify specific functions that may be subsets of applications. When an application is able to be decomposed into separate functional blocks, the code generator 120 may be capable of including only a subset of the application into a bootable executable. When the application may not be capable of easy decomposition into functional blocks, the code generator 120 may include the entire application as a single functional block, even though only a subset of the application may be used.

The code generator 120 may take advantage of executable code that is composable. Composable code in this context means that the executable code is written in a manner that functions can be combined in many different manners. Functional programming and functional programming languages are paradigms that are easily adapted to composable code, although composable code may be created in any programming language.

The operating system 124 may be composable in the sense that certain functions may be removed from the operating system and the operating system may still function, thus enabling the bootable executables 126 to include only a subset of the operating system 124.

A network 130 may connect the device 102 to the target devices 134. In some embodiments, a separate boot server 132 may be present.

The boot server 132 may service requests from the target devices 134 for bootable executables 138. A code server 136 may receive the request, identify an appropriate bootable executable 138, and transmit the selected bootable executable to the target device. In some embodiments, such a request may be a Pre-eXecution Environment (PXE) request for bootable code. When a target device receives a bootable executable, the target device may begin executing the bootable executable.

A boot server 132 may include a system manager 140 which may analyze a request from a target device 134 and determine which function set or corresponding bootable executable 138 to transmit to the target device 134.

In some embodiments, the bootable executables 138 may be created by the code generator 120 on the device 102, then copied to the boot server 132 for distribution. Many such embodiments may have a predefined function set for the bootable executables 138, which the system manager 140 may allocate to different target devices 134.

In other embodiments, the bootable executables 138 may be created on demand. In such embodiments, a code server 142 located on the device 102 or a code server 136 on the boot server 132 may receive a request from a target device 134, then a system manager 128 or 140 may identify a function set for the requesting device. The code generator 120 may then create a bootable executable comprising the function set, which may be transmitted to the requesting device.

Figure 2:
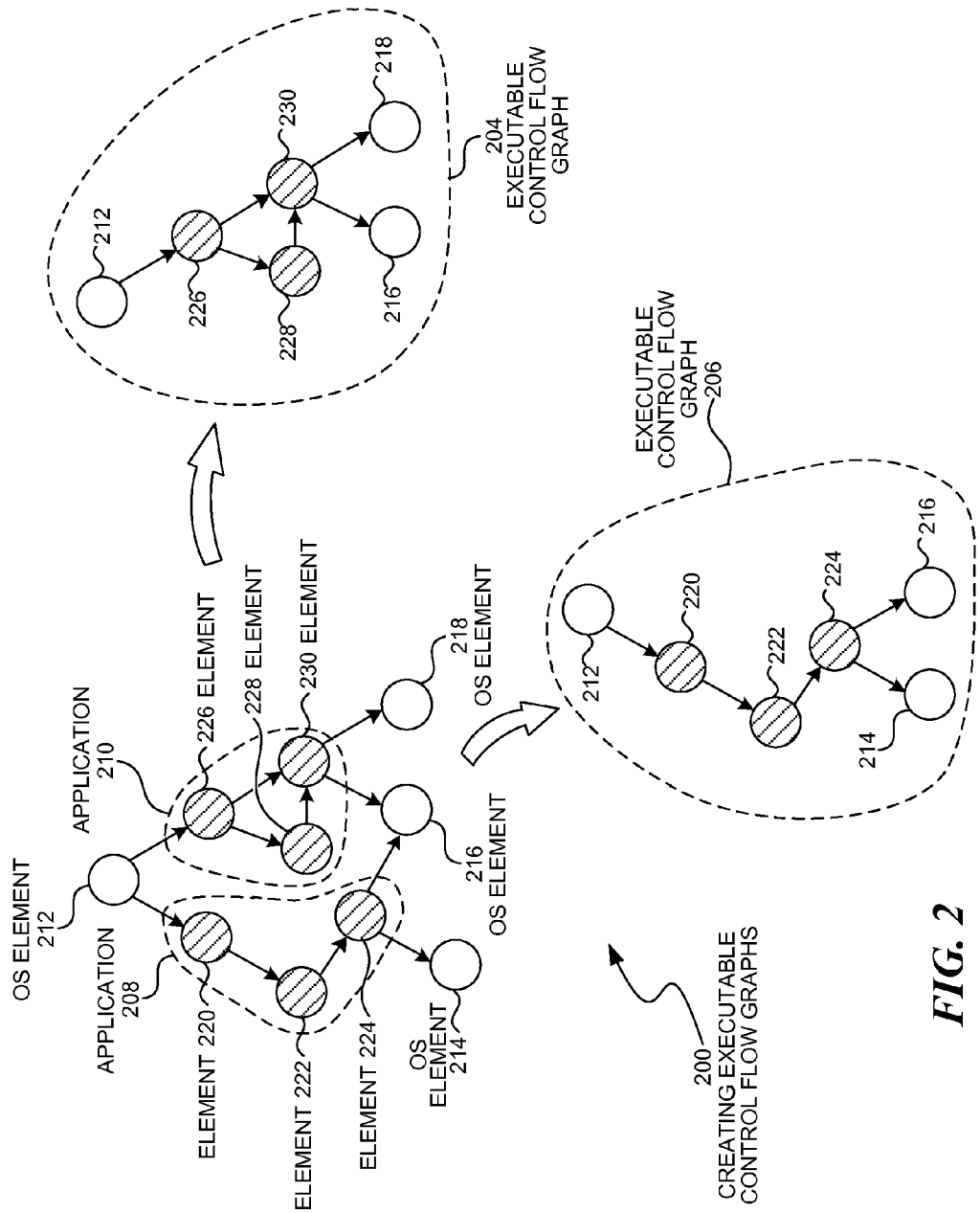
FIG. 2 is a diagram illustration of an embodiment showing an example control flow graph and how the control flow graph may be used to generate executable control flow graphs.

FIG. 2 illustrates an example embodiment 200 showing how a control flow graph 202 may be analyzed to create two different executable control flow graphs 204 and 206, each of which may have a subset of functionality of the entire control flow graph 202.

The control flow graph 202 may represent a control flow graph that contains all of the executable elements of two applications and an operating system. The operating system elements include 212, 214, 216, and 218. Application 208 includes elements 220, 222, and 224. Application 210 includes elements 226, 228, and 230.

Each of the executable elements in the control flow graph 202 may represent a composable functional block of executable code. As a composable functional block, the block of executable code may be combined with other blocks to form a pipeline or sequence of processing elements. In many embodiments, each composable functional block may not change state of outside variables or data elements. As such, a composable functional block may typically receive a data object, process the data object, then return a new data object without changing other data objects that may be present in the system.

The control flow graph 202 may illustrate executable elements and relationships between those elements. In the simplified example of embodiment 200, the relationships may be direct calls of one element from another, such as function calls or message passing relationships, as well as data passing relationships, such as when one element waits to receive a data object that may be created by another element.

The control flow graph 202 may represent the entire control flow graph of a set of applications and an operating system. Each application that calls an operating system element may have a relationship to that operating system element. When such a control flow graph exists, subsets of the overall graph may be created that only include the executable elements that may be used to provide certain subsets of functionality. These subsets may be converted into bootable executable code and transmitted to target devices.

In the example of embodiment 200, a system manager may identify a functional set for a first target device that includes element 228. Element 228 may be a subset of the application 210. By traversing the control flow graph 202, the executable control flow graph 204 may be identified that includes all upstream and downstream elements that may be called when providing the functionality of embodiment 228.

The executable control flow graph 204 may include application elements 226, 228, and 230, as well as operating system elements 212, 216, and 218. From the executable control flow graph 204, an executable set of code may be created. The control flow graph 204 may include some but not all of the operating system elements, as operating system element 214 may be omitted.

Similarly, a system manager may identify application 208 as a function set for a second target device. By traversing the control flow graph 202, a control flow graph 206 may be identified that includes all of the executable elements that interface with the application 208. These elements include operating system elements 212, 214, and 216, as well as application executable elements 220, 222, and 224. As with the control flow graph 204, a subset of the operating system elements are included in control flow graph 206, as operating system element 218 may be omitted.

Figure 3:
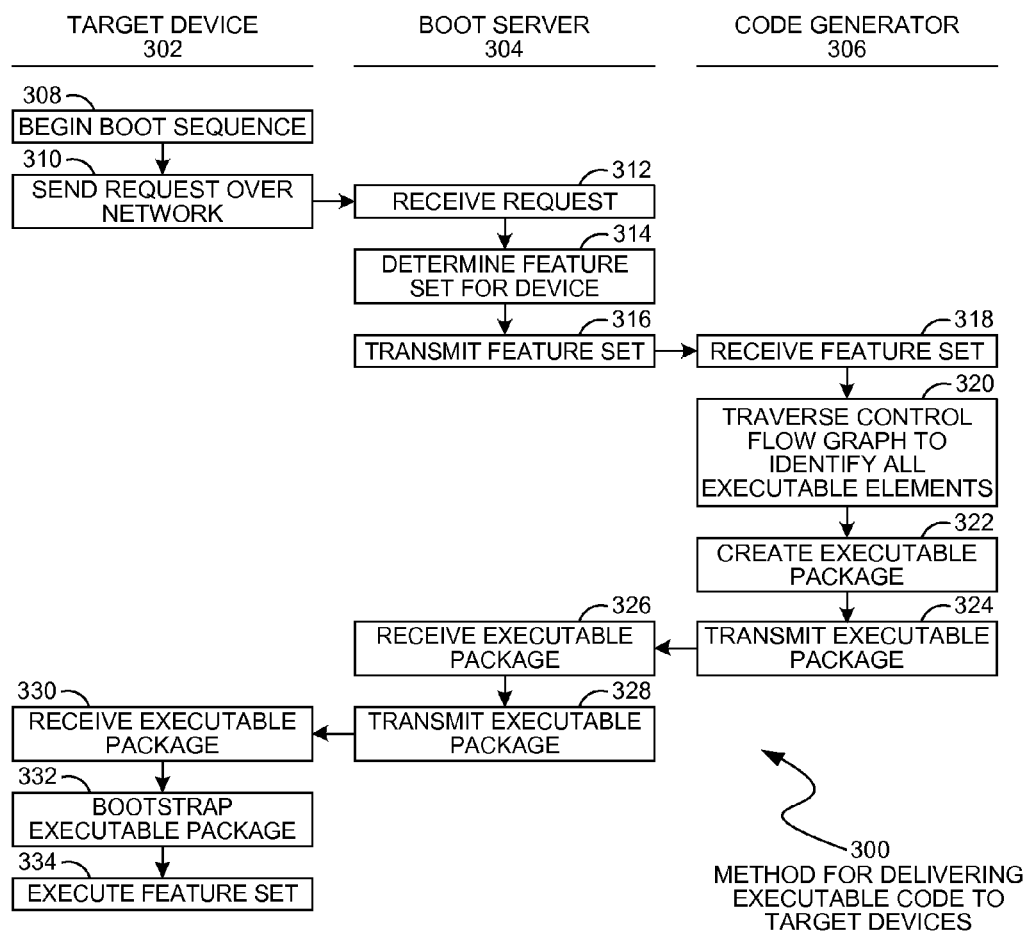
FIG. 3 is a timeline illustration of an embodiment showing an example interaction between a target device, a boot server, and a code generator.

FIG. 3 is a timeline illustration of an embodiment 300 showing the operations of a target device 302 in the left hand column, the operations of a boot server 304 in the center column, and the operations of a code generator 306 in the right hand column.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 illustrates an embodiment where an executable package may be created after a device requests bootable code. In such an embodiment, the executable package may contain customized, bootable executable code that can be created based on the current usage of the target device.

In block 308, the target device 302 may begin a boot sequence. As part of the boot sequence, the target device 302 may send a request over a network in block 310 for bootable executable code.

The request may be received in block 312 by a boot server 304. The boot server 304 may determine a feature set for the device in block 314, which may be transmitted in block 316 to the code generator 306, which may receive the feature set in block 318.

The feature set may define functions, applications, or other components that the target device may execute. The code generator 306 may traverse a control flow graph in block 320 to identify all of the executable elements that relate to the feature set.

Those executable elements may be used to create an executable package in block 322, which may be transmitted in block 324 to the boot server 304. The boot server 304 may receive the executable package in block 326 and may forward the package in block 328 to the target device 302.

The target device 302 may receive the executable package in block 330, then bootstrap itself using the executable package in block 332 to execute the feature set in block 334.

Figure 4:
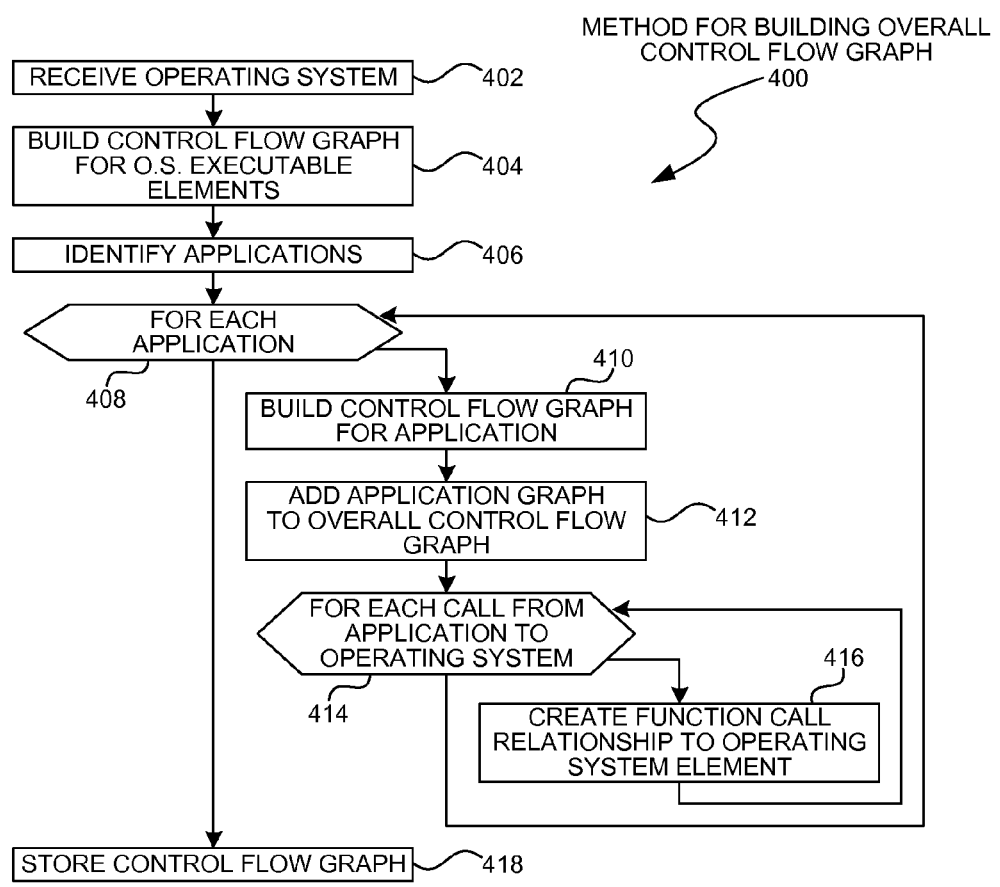
FIG. 4 is a flowchart illustration of an embodiment showing a method for creating a high level control flow graph.

FIG. 4 is a timeline illustration of an embodiment 400 showing a method for building a control flow graph that includes multiple applications and relationships to operating system functions.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 illustrates a method for creating a top level control flow graph which may include multiple applications and operating system functions. This high level control flow graph may be used by a code generator to identify elements that may be gathered into an executable package which a target device may use.

The high level control flow graph may include all of the executable code that could be executed on a device. As such, the high level control flow graph may include more elements than may actually be executed on any single device. In some embodiments, the high level control flow graph may be constructed as a graph of graphs, where each application or function may be further defined in a subgraph.

In block 502, an operating system may be received. The operating system may be created using functional programming style and may be written in a functional language. From the operating system, a control flow graph may be created in block 504 for the operating system executable elements.

In some embodiments, an analysis mechanism may create a control flow graph by analyzing compiled code, which may be machine level code, assembler level code, intermediate code, or some other form of compiled code. In other embodiments, a compiler may create and save a control flow graph at compile time. The compiler may be a high level language compiler, intermediate code compiler, or some other compiler.

In block 506, applications that may be executed on target devices may be identified. Each application may be processed in block 508.

For each application in block 508, a control flow graph may be built for the application. In some embodiments, the control flow graph may be an artifact provided by a compiler, while other embodiments may create a control flow graph by analyzing sourced code or compiled code.

In some embodiments where an application may not be written in a functional form or where no analysis mechanism may be available to create a control flow graph, an application may be treated as a single executable element.

The application may be added to the larger control flow graph in block 512. Each call from the application to the operating system may be identified and processed in block 514. For each call or communication between the application and the operating system in block 514, a function call or other relationship may be identified in block 516 and added to the control flow graph.

After processing each application in block 508, the control flow graph may be stored in block 518.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A computer implemented method comprising:
  receiving a control flow graph comprising application executable elements, operating system executable elements, and relationships between executable elements;
  identifying a feature set for a target device, said feature set comprising functions to be executed by said target device;
  traversing said control flow graph to identify said application executable elements and said operating system executable elements that relate to said feature set; and
  creating an executable package comprising said application executable elements and said operating system executable elements, said executable package being an operable set of executable code for said target device for said feature set.

2. The method of claim 1, said operating system executable elements being a subset of an operating system.

3. The method of claim 2, said control flow graph comprising executable elements from a plurality of applications.

4. The method of claim 3, said feature set comprising at least one subset of said operating system.

5. The method of claim 3, said feature set comprising a subset of said plurality of applications.

6. The method of claim 3, said feature set comprising a subset of one application within said plurality of applications.

7. The method of claim 1 further comprising:
  configuring said executable package for execution on said target device.

8. The method of claim 7 further comprising:
  compiling at least one executable element prior to creating said executable package.

9. The method of claim 1 further comprising:
  receiving a request for executable code from said target device; and
  transmitting said executable package to said target device.

10. The method of claim 9, said creating said executable package being performed after said receiving said request.

11. The method of claim 10, said request being a PXE request.

12. The method of claim 1 further comprising:
  receiving a first application, said first application comprising operating system calls;
  creating a first control flow graph for said first application, said first control flow graph comprising said operating system executable elements called by said first application; and
  adding said first control flow graph to said control flow graph.

13. A system comprising:
  an executable code creator operating on a computer processor, said executable code creator that:
    identifies a feature set for a target device, said feature set comprising functions to be executed by said target device;
    traverses a control flow graph comprising application executable elements, operating system executable elements, and relationships between executable elements to identify said application executable elements and said operating system executable elements that relate to said feature set; and
    creates an executable package comprising said application executable elements and said operating system executable elements, said executable package being an operable set of executable code for said target device for said feature set.

14. The system of claim 13 further comprising:
  a code server that:
    receives a request for executable code from said target device; and
    transmits said executable package to said target device.

15. The system of claim 14, said request being a PXE request.

16. The system of claim 14, said code server operating on a second computer processor.

17. The system of claim 14, said executable code generator creating said executable package after said code server receives said request.

18. A computer-implemented method comprising:
  receiving a request for executable code from a target device;
  receiving a feature set for said target device, said feature set comprising functions to be executed by said target device;
  traversing a control flow graph comprising application executable elements, operating system executable elements, and relationships between executable elements to identify said application executable elements and said operating system executable elements that relate to said feature set;
  creating an executable package comprising said application executable elements and said operating system executable elements, said executable package being an operable set of executable code for said target device for said feature set, said executable package comprising bootable software to execute on said target device; and
  transmitting said executable package to said target device.

19. The method of claim 18, said feature set being comprised in said request.

20. The method of claim 18, said feature set being received from a management device.

* * * * *